Jan. 2, 1962     L. C. EISAMAN ET AL     3,015,790
ADDITION CIRCUIT FOR STEP AND CONTINUOUS FUNCTIONS
Filed May 2, 1957
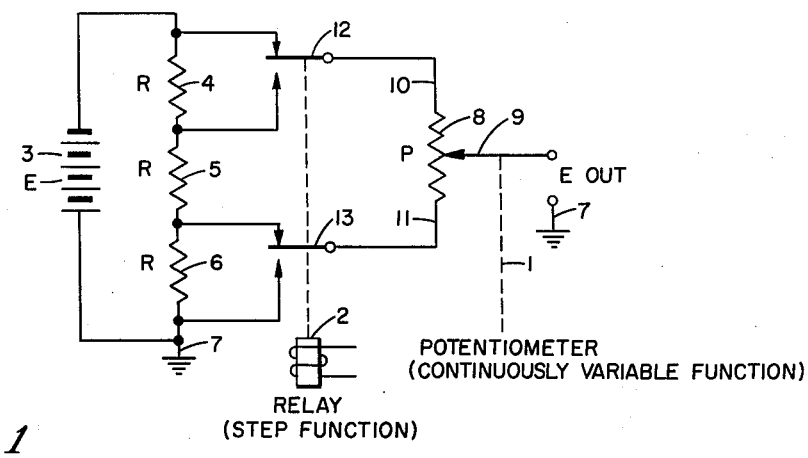
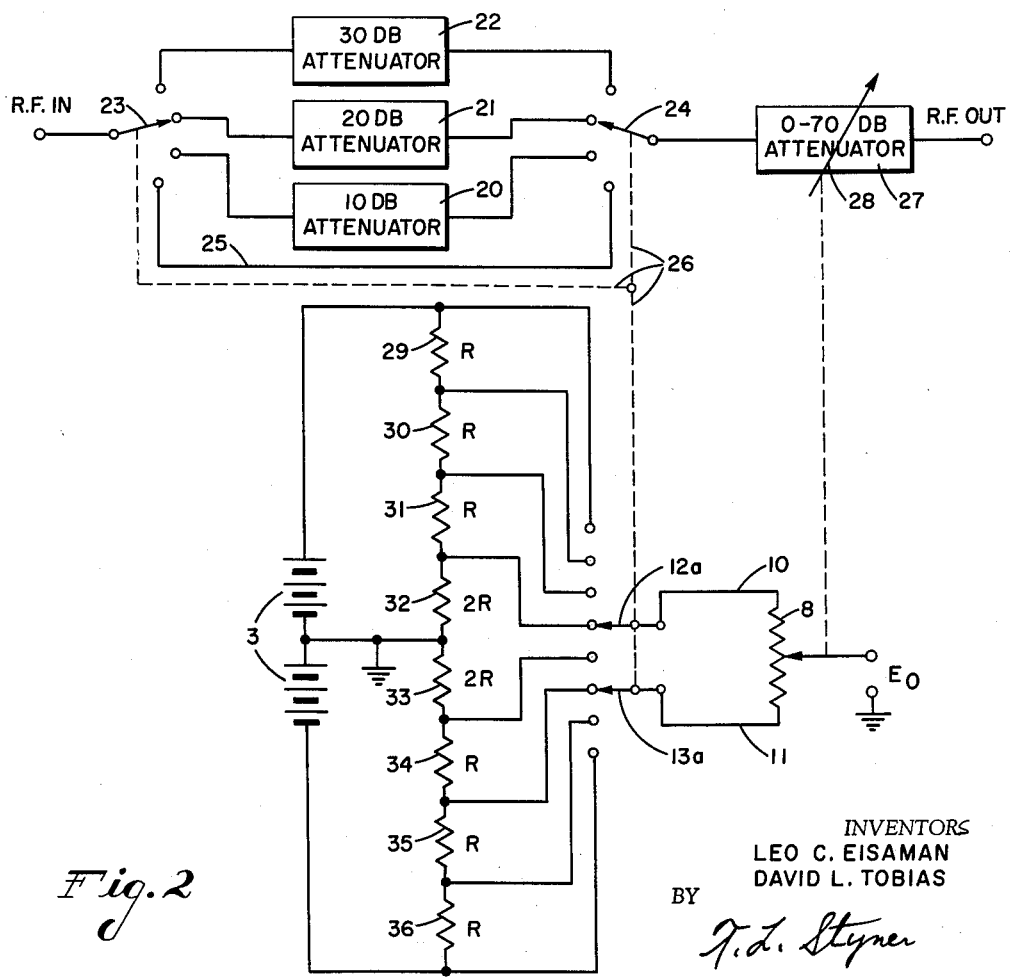
INVENTORS
LEO C. EISAMAN
DAVID L. TOBIAS
BY
ATTORNEY 3,015,790
ADDITION CIRCUIT FOR STEP AND
CONTINUOUS FUNCTIONS
Leo C. Eisaman, Rochester, and David L. Tobias, Fairport, N.Y., assignors to General Dynamics Corporation, Rochester, N.Y., a corporation of Delaware
Filed May 2, 1957, Ser. No. 656,708
3 Claims. (Cl. 333—81)

This invention relates to measuring circuits and is particularly directed to means for accurately adding two or more quanta by their voltage or current analogies.

Fixed resistors can be connected in various series and parallel combinations across a fixed voltage source to produce a resultant potential gradient across the combination that is representative of the algebraic sum of the various resistant values. Such a gradient can be accurately calibrated in terms of the fixed resistances. If now the ohmic value of one of the resistors is varied the proportion of currents through the parallel branches, or voltages drops across series branches, is changed and the calibration is upset. This inherent property of resistance networks is particularly troublesome when the resistance value rather than the voltage values are supposed to be analogies of the quantities to be added. A continuously variable resistance could not be, heretofore, added to more than one fixed resistor for a single set of voltage-resistance values.

An object of this invention is to provide an improved multiple range adding circuit.

Another object of this invention is to provide means for adding a step function to a continuously variable function.

A more specific object of this invention is to provide an improved measuring circuit which will accurately combine different fixed impedance values to a continuously variable impedance value and yet accurately add and indicate all combinations of these values.

The objects of this invention are attained by connecting a continuously variable impedance, or potentiometer, across electrically spaced points on a second potentiometer with means to shift in unison the two spaced points to change the voltage level of the two points with respect to the mean level of the first potentiometer without changing the voltage across the first potentiometer.

Other objects and features of this invention will become apparent to those skilled in the art by referring to the specific embodiments described in the following specification and shown in the accompanying drawing in which:

FIGURE 1 is a circuit diagram on one embodiment of this invention, and

FIGURE 2 is a diagram of the measuring circuit of this invention showing its application to one exemplary system in which the measuring circuit may be used.

In FIGURE 1, the mechanical link 1 is understood to represent a continuously variable function, such as a dial, a rotatable shaft, a voltage to be measured, or any electrical or mechanical phenomena which is to be evaluated quantitatively. Relay 2, on the other hand, is exemplary of a step function device, in this case the device being capable of two distinct stable conditions. Either of the voltages applied to the winding of the coil shown at 2 is to be added arithmetically to any value read in by linkage 1.

A voltage source 3 is required. The source 3 must be regulated so that the terminals remain at a calibrated level throughout measuring operations. In its simple form, the potentiometer across the source 3 is comprised of three resistors 4, 5, and 6. The resistors are all of the same ohmic value and their junctions are tapped so that voltage potentials between the taps are of uniformly different levels or steps. A reference potential is added to the potentiometer as by a ground connection 7 connected at one end of the potentiometer. The reference or ground potential may, however, be applied to any intermediate point on the potentiometer 4, 5, 6, or to an intermediate point on the voltage source 3.

The second potentiometer 8 with the sliding contact 9 and terminals 10 and 11 is provided. The output of the measuring system is connected, respectively, to the sliding contact 9 and the ground 7. Switch means comprising two single-pole double-throw switches 12 and 13 are provided with the poles mechanically interlinked to actuate the switches in unison. The switch contacts are connected to uniformly spaced points on potentiometer 4, 5, 6. It is apparent that the voltage drop across potentiometer 8 is, in the example shown, equal to $$\frac{2R}{3} \cdot E$$

where R is the ohmic value of each resistor 4, 5, and 6, and E is the voltage of source 3. When the relay 2 is actuated the voltage drop across potentiometer 8 does not change in magnitude, yet its value with respect to ground, or any other reference voltage, changes by the amount $$\frac{R}{3R} \cdot E$$

The output voltage $E_0$ may be continuously varied by the amount $$\frac{2R}{3} \cdot E$$

by adjusting the slider 9, and $E_0$ may be changed by $E/3$ by actuating the relay. That is, output voltage will be the sum of the voltages determined by the position of the relay 2 and of the potentiometer 8.

The number of steps in the step function which can be read will depend only upon the number of resistors and taps in the potentiometer across source 3. The switching arrangement would, of course, be enlarged to keep the terminal voltage at 10, 11 constant as the spaced contacts are shifted.

FIGURE 2 shows one system in which two quantities, one stepped and the other continuously variable, may be represented by two measurable voltage analogies. The system to be measured in FIGURE 2 is an array of attenuators connected in a microwave transmission line and comprises attenuators 20, 21 and 22, which have different fixed insertion loss values. Switches 23 and 24 are each single-pole multiple position switches and are connected, respectively, at the input and output ends of the attenuators to selectively connect the attenuators in circuit. Line 25 includes nearly zero attenuation. The mechanical linkage 26 assures switching in unison at the input and output ends of the attenuators. It follows that the mechanical position of the linkage 23 represents in steps the amount of attenuation in the microwave line.

Also in the microwave line is coupled the continuously variable attenuator 27, the adjustable shaft 28 being provided to smoothly change the attenuation. The measuring system of this invention effectively measures and indicates the total actual attenuation in the microwave system by adding the continuously variable shaft displacement at 28 to the step-by-step movement of linkage 26. Such an attenuator system, as that shown in FIGURE 2, might, for example, be used where attenuations must be measured continuously between zero and 100 db. Attenuators 20, 21, and 22 could, for example, represent 10 db, 20 db, and 30 db, while attenuator 27 could be variable smoothly between zero and 70 db.

The measuring circuit, in this particular case where there are four levels in the step function, will require a potentiometer with a sufficient number of equal impedances to provide four shifts with respect to ground of the voltage at terminals 10—11. In the example shown, resistors 29 to 36, inclusive, are of equal incremental values and are serially connected across regulated voltage source 3. The connections to the junctions of the series resistors are equally spaced, electrically. The two spaced contactor wipers, 12a and 13a, are adapted to connect spaced points of the potentiometer to the terminals 10 and 11 of potentiometer 8. The wipers are both mechanically connected with linkage 26 so that they can move in unison without changing the potential across terminals 10 and 11. In this example, the system is preferably grounded at the center of the potentiometer so that the voltage output, $E_0$, will vary equal distances in a positive and negative direction from ground. Where the recording or indicating instrument connected to the output terminals has a limited voltage range, it is merely necessary to adjust the voltage 3 to a value within that range.

While we have shown and described a preferred embodiment of this invention, it will be obvious to those skilled in the art that various modifications and substitutions may be made from the spirit of this invention which is to be limited only within the scope of the appended claims.

We claim:
1. An attenuator system comprising a plurality of fixed-value attenuators, switch means for selectively introducing said attenuators into a signal circuit, a continuously variable attenuator in said circuit, a first potentiometer with electrically evenly spaced taps, a source of voltage of predetermined value connected across the terminals of said potentiometer, a second potentiometer with terminals, switch means for selectively connecting said terminals to said uniformly spaced taps, a wiper on said second potentiometer, a first mechanical linkage between said selector switches of the attenuators and said first potentiometer, and a second mechanical linkage between said second attenuator and said wiper, so that the resultant voltage on said wiper is analogous to the total attenuation in said signal circuit.

2. In the attenuator system defined in claim 1, the impedance between said spaced taps being such that the voltages on said taps are analogous to the fixed values of said fixed-value attenuators, and the variable impedance of said second potentiometer being analogous to variable attenuation of said variable attenuator, so that the voltage at said wiper is proportional to the total attenuation in said signal circuit.

3. An attenuator system for a microwave transmission circuit comprising a plurality of fixed-value microwave attenuators, first switch means for selectively connecting said attenuators into said microwave transmission circuit, a continuously variable microwave attenuator with adjusting means in said microwave transmission circuit; means for indicating the total attenuation in said circuit without sampling the microwave energy flowing in said transmission circuit including a first potentiometer with electrically spaced taps, a source of voltage of predetermined fixed value connected across the terminals of said potentiometer, a second potentiometer with terminals and a continuously variable wiper, second switch means for selectively connecting the terminals of said second potentiometer to said taps, a first mechanical linkage between said first switch means and said second switch means, and a second mechanical linkage between the mentioned variable attenuation adjusting means and said wiper, the resistance values between taps of said first potentiometer and the resistance value subtended by said wiper being such that the voltages produced at said wiper is analogous to the sum of the fixed and variable attenuation values.

References Cited in the file of this patent
UNITED STATES PATENTS

| | | |
|---|---|---|
| 2,359,160 | Sauter | Sept. 26, 1944 |
| 2,659,589 | Hickman | Nov. 17, 1953 |
| 2,707,222 | Brown et al. | Apr. 26, 1955 |
| 2,729,727 | Molloy et al. | Jan. 3, 1956 |
| 2,775,754 | Sink | Dec. 25, 1956 |

FOREIGN PATENTS

| | | |
|---|---|---|
| 625,024 | Great Britain | June 21, 1949 |